(12) United States Patent
Manpathak et al.

(10) Patent No.: US 9,329,896 B2
(45) Date of Patent: May 3, 2016

(54) DATA REUSE TRACKING AND MEMORY ALLOCATION MANAGEMENT

(71) Applicant: VMware, Inc., Palo Alto, CA (US)

(72) Inventors: Sachin Manpathak, Mountain View, CA (US); Mustafa Uysal, Fremont, CA (US); Puneet Zaroo, Santa Clara, CA (US); Ricardo Koller, Mountain View, CA (US); Luis Useche, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 202 days.

(21) Appl. No.: 14/304,752

(22) Filed: Jun. 13, 2014

(65) Prior Publication Data

US 2015/0363236 A1      Dec. 17, 2015

(51) Int. Cl.
| | |
|---|---|
| *G06F 12/08* | (2006.01) |
| *G06F 9/50* | (2006.01) |
| *G06F 12/12* | (2016.01) |
| *G06F 12/02* | (2006.01) |
| *G06F 9/455* | (2006.01) |

(52) U.S. Cl.
CPC .......... *G06F 9/5016* (2013.01); *G06F 9/45558* (2013.01); *G06F 12/023* (2013.01); *G06F 12/122* (2013.01); *G06F 2009/4557* (2013.01); *G06F 2209/5022* (2013.01); *G06F 2212/1044* (2013.01); *G06F 2212/69* (2013.01)

(58) Field of Classification Search
CPC . G06F 12/0891; G06F 12/12; G06F 12/0811; G06F 12/0873
See application file for complete search history.

(56) References Cited

U.S. PATENT DOCUMENTS

| | | | |
|---|---|---|---|
| 6,282,613 B1 * | 8/2001 | Hsu ..................... | G06F 12/0802 711/118 |
| 2012/0117299 A1 | 5/2012 | Waldspurger et al. | |
| 2014/0173227 A1 * | 6/2014 | Min ..................... | G06F 3/0644 711/159 |
| 2015/0046653 A1 * | 2/2015 | Soundararajan .... | G06F 12/0873 711/122 |

OTHER PUBLICATIONS

G. Almási, C. Cascaval, and D. A. Padua, Calculating stack distances efficiently, SIGPLAN Not., 38(2 supplement):37-43, Jun. 2002.
P. Goyal, D. S. Modha, and R. Tewari, Cachecow: providing dos for storage system caches, In SIGMETRICS, pp. 306-307, 2003.

(Continued)

*Primary Examiner* — Adam M Queler
*Assistant Examiner* — Edmund Kwong

(57) ABSTRACT

Exemplary methods, apparatuses, and systems receive a first request for a storage address at a first access time. Entries are added to first and second data structures. Each entry includes the storage address and the first access time. The first data structure is sorted in an order of storage addresses. The second data structure is sorted in an order of access times. A second request for the storage address is received at a second access time. The first access time is determined by looking up the entry in first data structure using the storage address received in the second request. The entry in the second data structure is looked up using the determined first access time. A number of entries in second data structure that were subsequent to the second entry is determined. A hit count for a reuse distance corresponding to the determined number of entries is incremented.

20 Claims, 8 Drawing Sheets

(56) References Cited

OTHER PUBLICATIONS

A. Gulati, I. Ahmad, and C. A. Waldspurger, PARDA: Proportional allocation of resources for distributed storage access, In Proceedings of the 7th conference on File and Storage Technologies, pp. 85-98, Berkeley, CA, USA, 2009, USENIX Association.

G. Soundararajan, D. Lupei, S. Ghanbari, A. D. Popescu, J. Chen, and C. Amza, Dynamic resource allocation for database servers running on virtual storage, 7th conference on File and Storage Technologies, pp. 71-84, 2009.

VMware Virtual SAN, http://www.vmware.com/products/virtual-san/features.html, 2014, 6 pages.

P. Zhou, V. Pandey, J. Sundaresan, A. Raghuraman, Y. Zhou, and S. Kumar, Dynamic tracking of page miss ratio curve for memory management, SIGOPS Oper. Syst. Rev., 38(5):177-188, Oct. 2004.

C. Albrecht, A. Merchant, M. Stokely, M. Waliji, F. Labelle, N. Coehlo, X. Shi, and E. Schrock. Janus: Optimal flash provisioning for cloud storage workloads, In Proceedings of the USENIX Annual Technical Conference, pp. 91-102, 2560 Ninth Street, Suite 215, Berkeley, CA 94710, USA, 2013.

P. Sehgal, K. Voruganti, and R. Sundaram, Slo-aware hybrid store, In MSST, pp. 1-6, 2012.

Wikipedia, Bloom filter, http://en.wikipedia.org/wiki/Bloom_filter, 16 pages, 2014.

A. Gulati, A. Merchant, and P. Varman, mClock: Handling Throughput Variability for Hypervisor IO Scheduling, In 9th USENIX Symposium on Operating Systems Design and Implementation (OSDI '10), Oct. 2010, pp. 437-450.

A. Gulati, G. Shanmuganathan, I. Ahmad, C. A. Waldspurger, and M. Uysal, Pesto: Online Storage Performance Management in Virtualized Datacenters, In Proc. ACM Symposium on Cloud Computing (Socc 2011), Nov. 2011, 14 pages.

R. L. Mattson, J. Gecsei, D. R. Slutz, and I. L. Traiger, Evaluation techniques for storage hierarchies, IBMSystems Journal, 9(2):78-117, 1970.

Performance of vSphere flash read cache in vSphere 5.5, www.vmware.com/files/pdf/techpaper/vfrc-pert-vsphere55.pdf, 2013, 18 pages.

Technical White Paper: Storage I/O Control Technical Overview and Considerations for Deployment, VMware, Inc., 2010, 12 pages.

Technical White Paper: What's New in VMware, Virtual SAN, VMware, Inc., 2014, 18 pages.

* cited by examiner

US 9,329,896 B2

DATA REUSE TRACKING AND MEMORY ALLOCATION MANAGEMENT

FIELD OF THE INVENTION

The various embodiments described herein relate to the allocation of flash memory to virtual machines running on a host server. In particular, embodiments relate to dynamically determining data reuse patterns in the input/output workload of each virtual machine and to allocating flash memory based upon data reuse patterns.

BACKGROUND OF THE INVENTION

Host computers allocate portions of flash memory to virtual machines to serve as an input/output cache between the virtual machine and an underlying storage device. For example, an administrator may allocate a portion of the total amount of flash memory to a virtual machine that is equal to a percentage of the size of the virtual machine's virtual disk drive. As a result, data for the virtual machine may be fetched from the host computer's flash memory rather than by accessing the underlying storage device. The amount of benefit resulting from caching data blocks in flash memory, however, is dependent upon the workload and, in particular, the data reuse pattern of the workload. For example, allocating a large portion of flash to a virtual machine with a streaming workload (i.e. a workload with no data reuse) will result in little to no benefit. Additionally, there may be one or more other virtual machine workloads running on the host computer with a greater amount of data reuse that would better utilize that portion of flash memory.

Conventional algorithms used to determine data reuse in workloads consume large amounts of processing and memory resources. As a result, these algorithms are typically utilized for offline workload analysis. Given that the data reuse pattern for workloads can vary over time, it is challenging for administrators to specify flash allocations based upon data reuse in a given workload. This problem is exacerbated when the administrator is responsible for allocating flash in multiple host computers, each running thousands of virtual machines.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein track data reuse patterns for virtual machine workloads. Using a pair of sorted data structures, a memory manager is able to efficiently track the data reuse patterns. As a result, the memory manager is able to quickly estimate a miss-rate curve for each workload during runtime. Additionally, using the miss-rate curves, the memory manager is able to dynamically tune the allocation of memory. For example, the memory manager may allocate additional memory to the workloads that will benefit the most at a given point in time.

Figure 1:
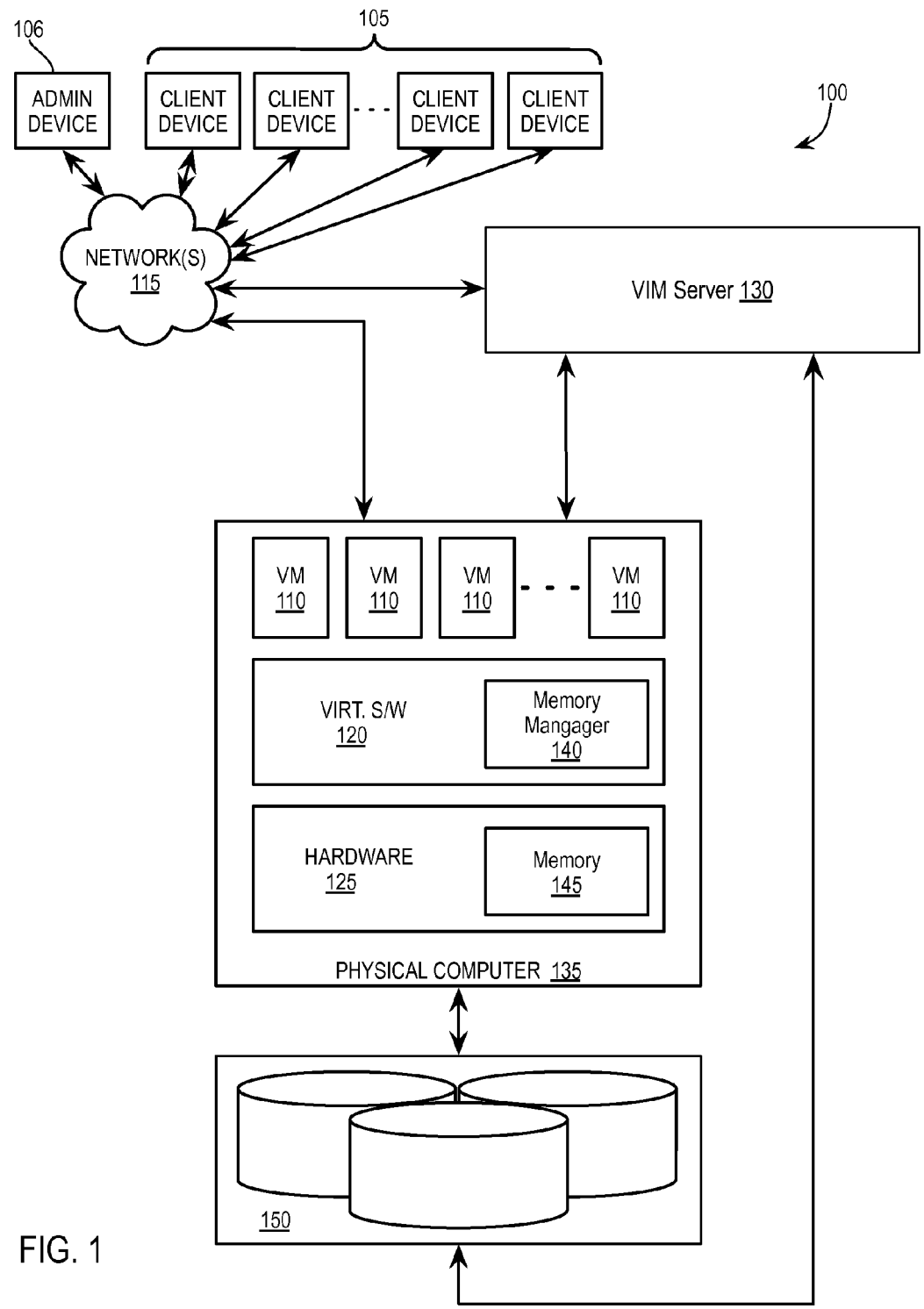
FIG. 1 illustrates, in block diagram form, an exemplary virtual datacenter environment including one or more networked processing devices to track data reuse and manage the allocation of memory to a plurality of workloads.

FIG. 1 illustrates, in block diagram form, an exemplary virtual datacenter environment 100 including one or more networked processing devices to track data reuse and manage the allocation of memory to a plurality of workloads. While embodiments are described herein with reference to server-based computing in a virtual datacenter environment, the embodiments of tracking data reuse patterns and allocating memory may be implemented in other computing environments that manage one or more workloads.

Server-based computing allows client devices 105 to access centrally managed user virtual desktops, such as those implemented by VMs 110, via network(s) 115 (e.g., a local area network or other private or publically accessible wide area network, such as the Internet). For example, client device 105 and VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110. Additionally, one or more VMs 110 may implement another virtualized compute, networking, storage, or security service (e.g., a firewall, webserver, database server, etc.).

Remote access to virtual desktops is generally provided to client devices 105 through virtual infrastructure management (VIM) server 130. In one embodiment, the VIM server 130 provides virtual desktop access to the client devices 105. Additionally, or alternatively, VIM server 130 orchestrates the provisioning of software defined datacenter services implemented by one or more VMs 110. VIM server 130 may be a physical computer system or a virtual machine that runs infrastructure management software to, e.g., provide a remotely accessible user interface to administrator device 106 to manage the configuration of VMs 110, host computer(s) 135, and storage device(s) 150.

Each storage device 150 may be a disk array or other collection data stores. For example, each storage device 150 may implement a redundant array of independent disks (RAID) algorithm to combine multiple drive components into a logical unit and divide and/or replicate data among multiple physical drives. In one embodiment, storage device 150 includes a processing device or other storage controller (not shown) and or a cache (not shown).

VMs 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of host computer 135 manages one or more VMs 110. Virtualization software layer 120 manages physical resources, e.g., hardware 125, as well as maintains virtual-to-physical hardware mappings. For example, virtualization software layer 120 maps each VM 110 to a portion of memory 145 allocated to the VM 110. Memory 145 may be flash memory or another high-speed memory used to implement a cache between VMs 110 and storage 150. As a result, data for a given VM 110 may be quickly fetched from the host computer's local memory 145 rather than by accessing underlying storage 150.

Virtualization software 120 includes memory manager 140. In one embodiment, memory manager 140 tracks data reuse patterns and estimates a miss-rate curve for each workload during runtime, e.g., as described with reference to FIGS. 2-10. In one embodiment, memory manager 140 dynamically allocates portions of memory 145 to VMs 110 based upon tracked data reuse patterns, e.g., as described with reference to FIGS. 10-11.

Figure 2:
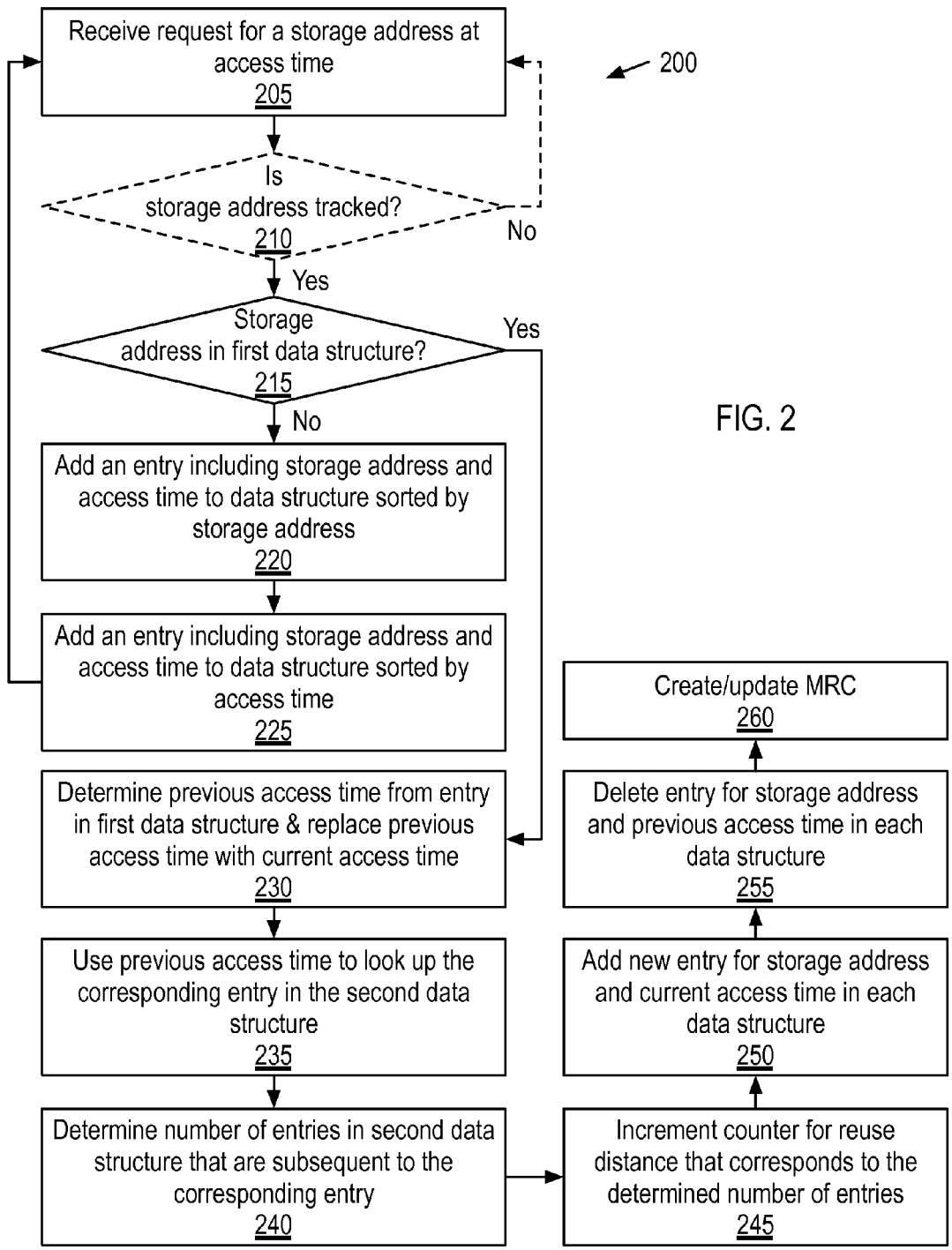
FIG. 2 is a flow chart illustrating an exemplary method of tracking data reuse patterns.

FIG. 2 is a flow chart illustrating exemplary method 200 of tracking data reuse patterns. At block 205, memory manager 140 receives a request for a storage address at an access time. For example, VM 110 may issue an input/output (I/O) request including a virtual storage address. In one embodiment, memory manager 140 notes the time of the request (e.g., using an internal clock) and maps the virtual storage address to a storage address within underlying storage 150. Alternatively, memory manager 140 utilizes the virtual storage address as received from VM 110. The storage address may be or otherwise refer to a logical unit number, block, volume, page, or other addressable portion of storage.

At block 210, memory manager 140 optionally determines if the received storage address is used for tracking data reuse patterns. For example, memory manager 140 may only use a subset of storage addresses to track and estimate data reuse patterns. In one embodiment, memory manager 140 utilizes a bloom filter, hash table, or similar space efficient data structure to determine if the received storage address is within the subset. Alternatively, memory manager 140 may only use storage addresses requested in a particular interval. For example, memory manager 140 may only use the storage addresses of every 1 in 100 requests, every 100 in 1000 requests, or another interval-based sampling strategy. In yet another embodiment, memory manager 140 only uses storage addresses from requests that result in a cache miss.

If the storage address is not within the subset, method 200 returns to 205 to process the next request. If the storage address is within the subset or if method 200 omits block 210, at block 215, memory manager 140 determines if the storage address has previously been entered in a first structure. In one embodiment, data reuse patterns are tracked using two data structures. For example, memory manager 140 maintains entries including the storage address and access time of read requests in each of a pair of binary search trees or similar data structures. Memory manager 140 sorts the first data structure in an order of storage addresses and the second data structure in an order of access times. Given the sorted order, memory manager 140 is able to quickly determine if an entry in the first data structure includes a storage address. Examples of the first and second data structures are described with reference to FIGS. 3-8.

If the first data structure does not include an entry with the received storage address, at block 220, memory manager 140 adds an entry including the storage address and access time to the first data structure. At block 225, memory manager 140 also adds an entry including the storage address and access time to the second data structure and method 200 returns to block 205 to process the next request.

If the first data structure does include an entry with the received storage address, at block 230, memory manager 140 determines the access time of the previous request for the storage address. As described above, due to the sort order of the first data structure, memory manager 140 is able to quickly traverse the first data structure searching for the storage address. Once found, the corresponding entry will also include the previous access time for that storage address.

At block 235, memory manager 140 uses the previous access time to look up the corresponding entry in the second data structure. Given the second data structure is sorted by access time, memory manager 140 is able to quickly traverse the second data structure to locate the corresponding entry.

At block 240, memory manager 140 determines the number of entries in the second data structure that are subsequent to the entry that includes the received storage address and previous access time. Again, given the second data structure is sorted by access time, memory manager 140 is able to quickly count subsequent entries. The number of subsequent entries is used as the reuse distance for the received storage address.

At block 245, memory manager 140 increments a hit count for the determined reuse distance. As the workload generates requests over time, memory manager 140 increments hit counts for various reuse distances. For example, memory manager 140 may maintain a table, array, or other data structure to store hit counts for various reuse distances. An exemplary hit count data structure is described with reference to FIG. 9.

At block 250, memory manager 140 adds a new entry for the requested storage address with the current access time to the first and second data structures. At block 255, memory manger 140 deletes the corresponding previous entry from each data structure. In an alternate embodiment, memory manager modifies the previous entry to replace the previous access time with the current access time and sorts the second data structure to account for the new access time.

At block 255, memory manager 140 optionally creates or updates a miss-rate curve (MRC) using the hit counts for the various reuse distances. For example, if the reuse distances correspond to blocks of memory, the miss-ratio for a memory having been allocated m blocks and having a maximum possible allocation of n blocks may be calculated using the following equation:

$$1-(\Sigma_{i=0}^{m}\text{Hit}[i]/\Sigma_{i=0}^{n}\text{Hit}[i]+\text{Miss}[\infty])$$

in which Hit[i] refers to the hit count for a given reuse distance, i, and Miss[∞] represents the number of misses that occur even if the maximum of n blocks is allocated. The MRC can be constructed by computing the miss-ratios for various block allocations. A diagram of an exemplary MRC is described with reference to FIG. 10.

As described above, memory manager 140 may only use a subset of storage addresses to track and estimate data reuse patterns. Given this subset only represents the reuse distance for a sampling of storage addresses, in one embodiment, memory manager 140 scales the reuse hit counts to the actual number of storage addresses. For example, if the subset represented a sampling of 1% of the actual number of blocks that may be requested, memory manager 140 may treat each block within the subset as representing 100 blocks. As such, the hit count for a given block within the subset may be copied to produce a total of 100 reuse distances with the same hit count.

In one embodiment, memory manager 140 creates or updates the MRC for a given workload following a threshold number of requests. For example, memory manager 140 may first create an MRC for a workload after receiving a threshold number of requests following an initial allocation of memory to the workload. Additionally, memory manager 140 may update the MRC in intervals of a threshold number of requests, rather than updating the MRC with every request.

Figure 3:
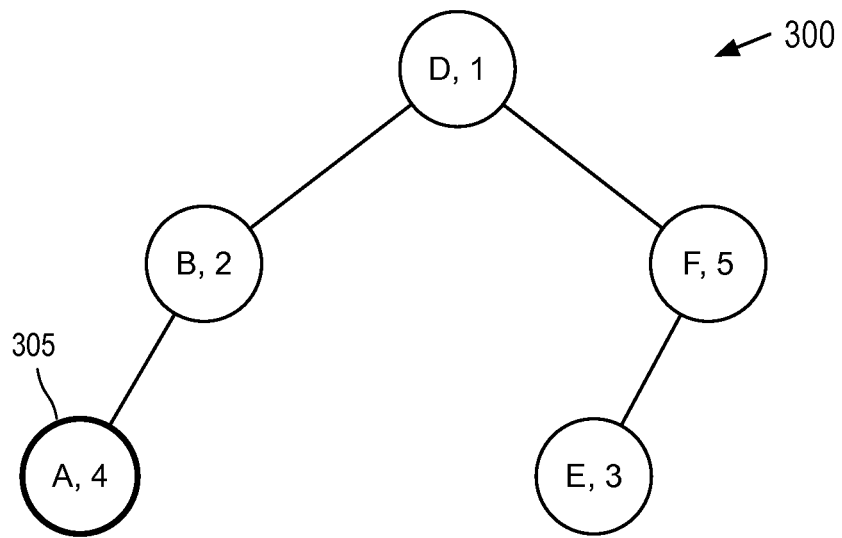
FIGS. 3-8 are a diagrams of exemplary data structures used to track data reuse patterns.

FIGS. 3-8 are diagrams of exemplary data structures used to track data reuse patterns. FIG. 3 illustrates binary tree 300. Each entry in binary tree 300 includes a storage address and an access time. Alphabetic characters represent storage addresses and numbers represents access times. Binary tree 300 is sorted (as illustrated from left to right) in an order of storage addresses (represented herein by alphabetic order). For example, entry 305 resulted from a request including storage address "A" at access time "4." Given that A falls earlier in the order of entries than B-F, entry 305 is in the first (left-most) position in binary tree 300.

Figure 4:
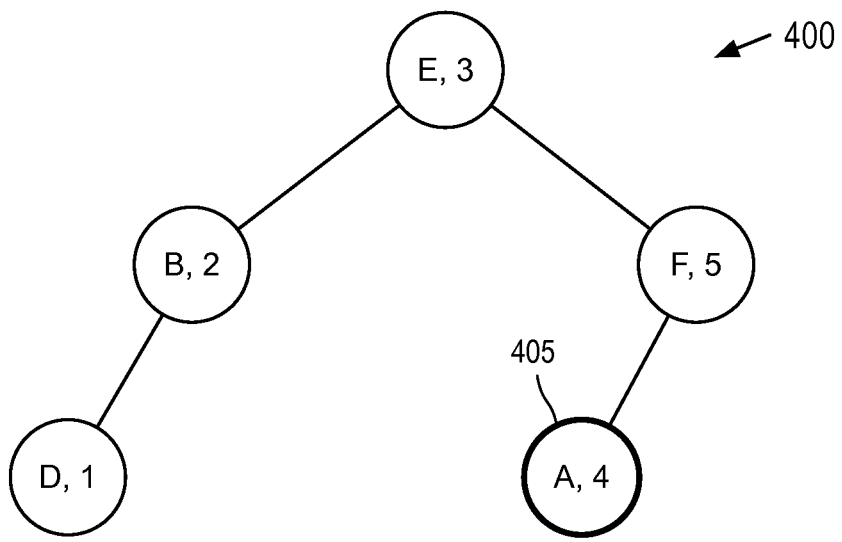

FIG. 4 illustrates binary tree 400. Each entry in binary tree 400 also includes a storage address and an access time that corresponds to the entries in binary tree 300. For example, entry 405 in binary tree 400 corresponds to entry 305 in binary tree 300. Binary tree 400 is sorted (as illustrated from left to right) in an order of access times. Given that the access time, 4, for entry 405 falls earlier in the order of entries than 5 and follows 1-3, entry 405 is in the second to last (first from the right) position in binary tree 300.

Figure 5:
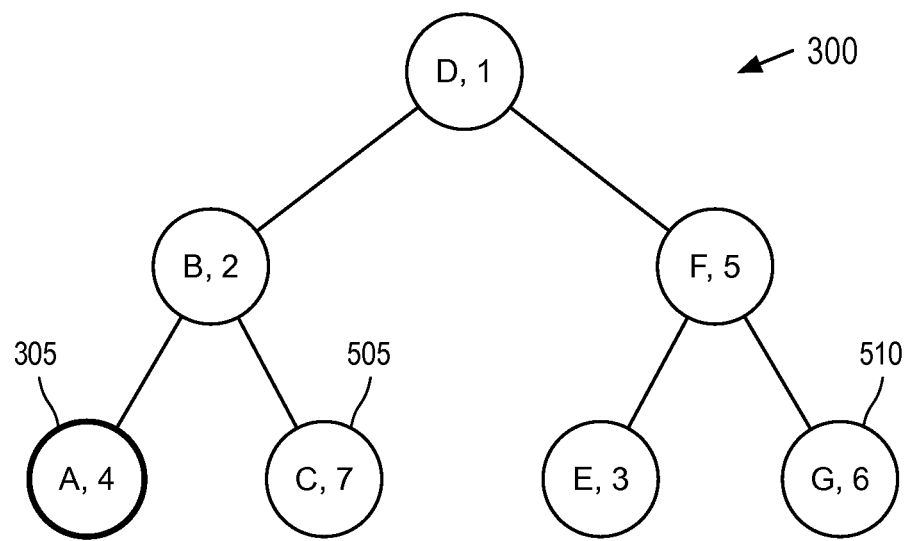

FIG. 5 illustrates binary tree 300 following the addition of two subsequent entries. Continuing with the use of ordering by storage addresses, a request for storage address C resulted in entry 505 being added between entries for storage addresses B and D, and a request for storage address G resulted in entry 510 being added to the last position, following the entry for storage address F. Entry 305 remains in the first position.

Figure 6:
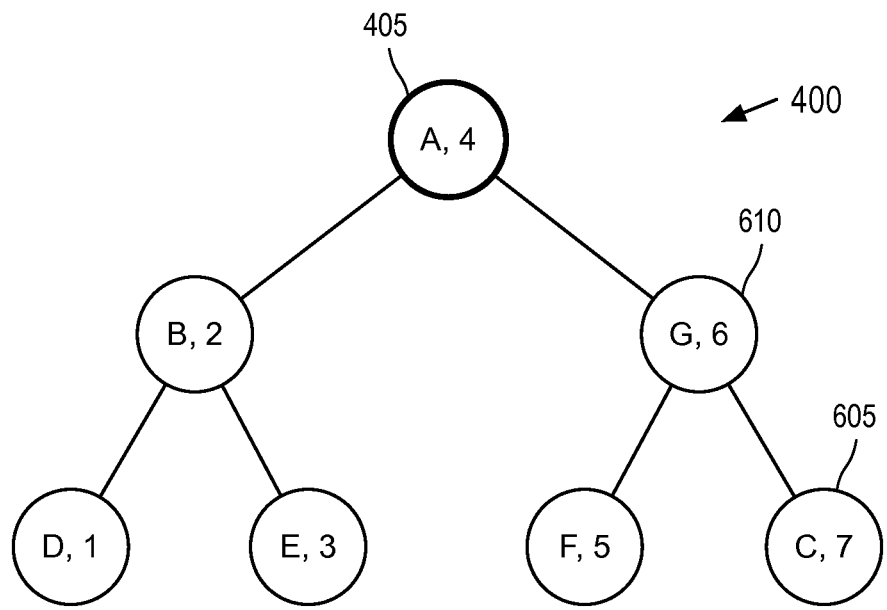

FIG. 6 illustrates binary tree 400 following the addition of two corresponding subsequent entries. Entry 605 corresponds to entry 505 and entry 610 corresponds to entry 510. Continuing with the use of ordering by access time, entries 610 and 605 are added to the last two positions in binary tree 400. Given the sort order, entry 405 became the root of binary tree 400 as a result of the two additional entries.

Figure 7:
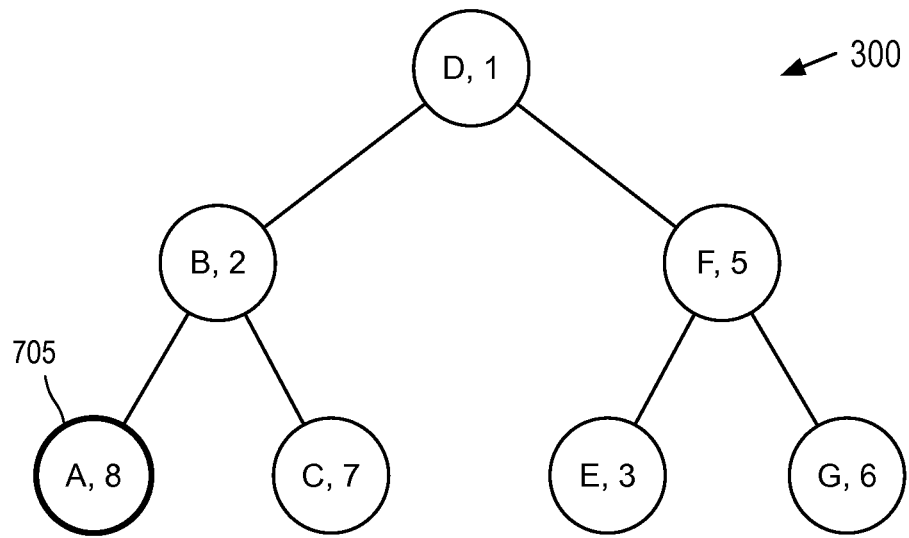

FIG. 7 illustrates binary tree 300 following a request for a previously added storage address. For example, at access time 8, memory manager 140 receives another request for storage address A. Upon determining entry 305 includes storage address A, memory manager 140 uses the access time, 4, from entry 305 to traverse binary tree 400 and determine a reuse distance as described above. For example, referring to FIG. 6, memory manager 140 may traverse binary tree 400 to count all entries to the right of entry 405, resulting in a reuse distance of 3. Memory manager 140 increments the hit count for that reuse distance. Additionally, memory manager 140 replaces entry 305 with entry 705 to account for the most recent access time, 8, for storage address A.

Figure 8:
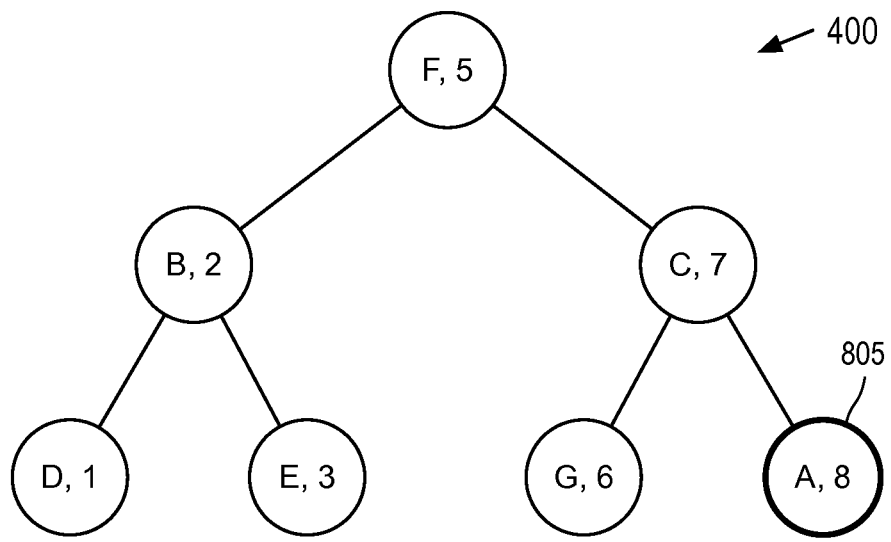

FIG. 8 illustrates binary tree 400 following the request for the previously added storage address, A. Similar to binary tree 300, memory manager 140 replaces entry 405 with entry 805 to account for the most recent access time, 8, for storage address A. Memory manager 140 adds entry 805 to the end of binary tree 400.

Figures 9, 10:
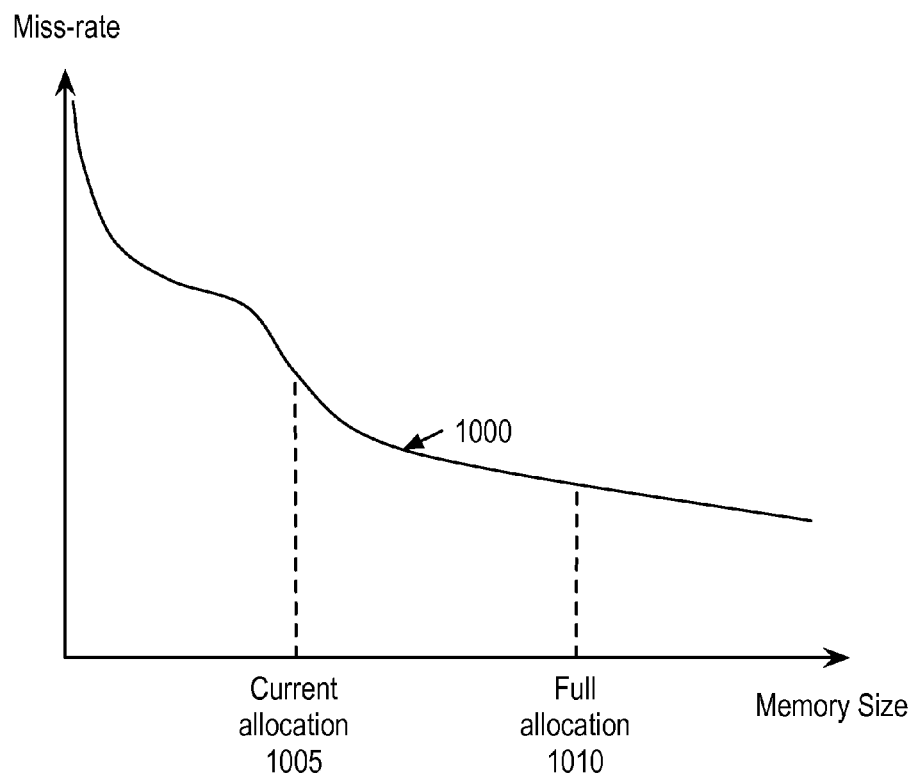
FIG. 9 is an exemplary data structure used to track hit counts and data reuse distances.
FIG. 10 is a chart of an exemplary miss-rate curve calculated using tracked data reuse patterns.

FIG. 9 is an exemplary data structure 900 used to track hit counts for various reuse distances. For example, data structure 900 may initially begin with hit counts set to zero. As memory manager 140 processes requests, hit counts are incremented as described herein. Following the example illustrated in FIGS. 3-8, the subsequent request for the previously added storage address, A, resulted in memory manager 140 determining that the storage address had a reuse distance of 3. Based upon this determination, memory manager increments the hit count for an entry 905 in data structure 900 corresponding to the reuse distance of 3.

FIG. 10 is a chart of an exemplary MRC 1000 for a workload calculated using tracked data reuse patterns. As illustrated, a step decline in miss rate occurs as allocated memory increases from zero. The decline in miss rate then varies as memory allocation increases toward full allocation. In one embodiment, memory manager 140 utilizes MRC 1000 to determine whether or not to allocate additional memory to the workload. For example, memory manager 140 may compare the miss rate at current allocation 1005 to the miss rate at full allocation 1010 (or another allocation value). Based upon that comparison and, optionally, prioritization of workloads, memory manager 140 may determine that the workload's hit rate will improve from additional allocation of memory and increase the amount of memory allocated to the workload.

Figure 11:
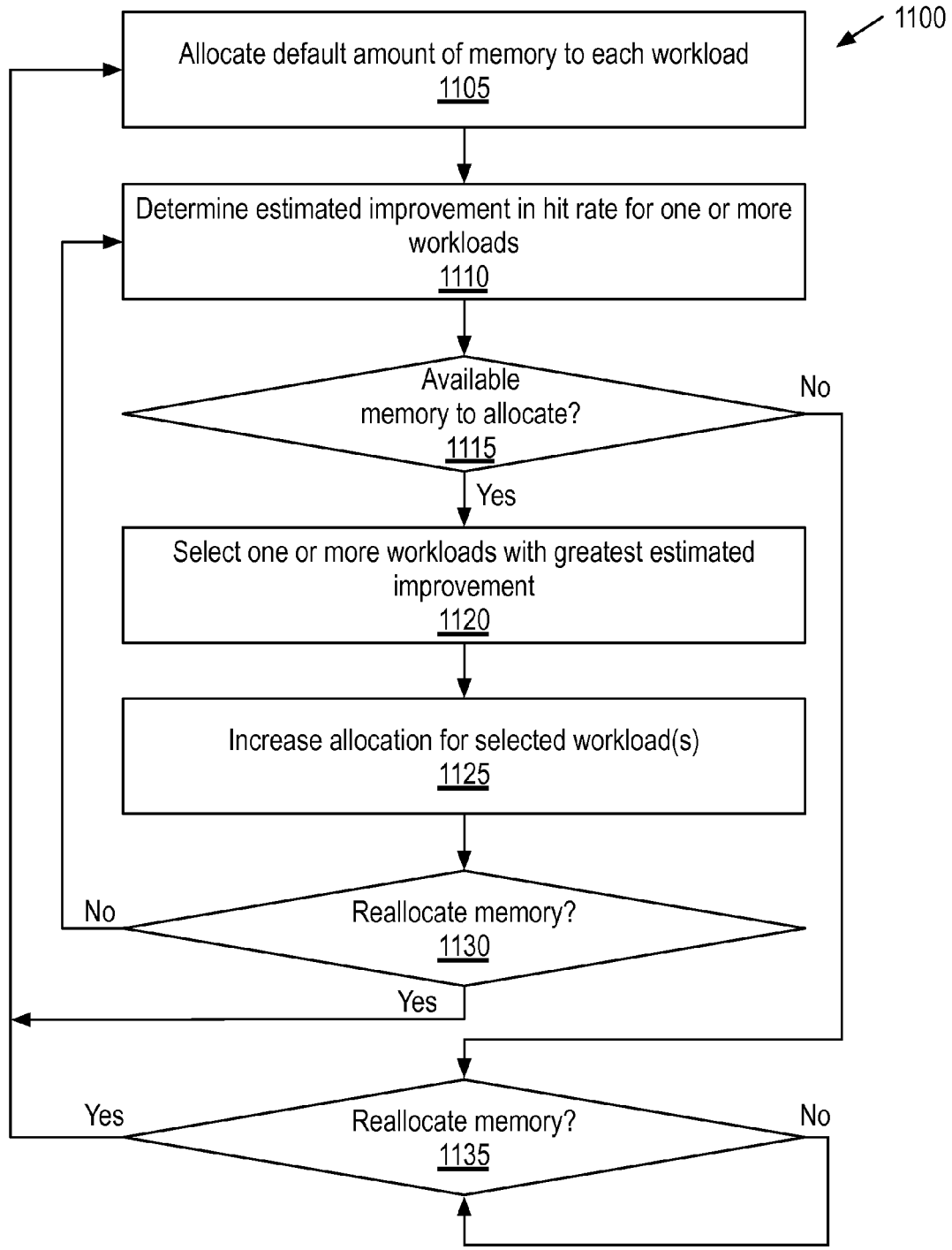
FIG. 11 is a flow chart illustrating an exemplary method of managing memory allocations for a plurality of workloads.

FIG. 11 is a flow chart illustrating an exemplary method 1100 of managing memory allocations for a plurality of workloads. At block 1105, memory manager 140 allocates a default amount of memory 145 to each workload (e.g., to each VM 110). In one embodiment, each workload is initially allocated no memory and memory is allocated in increments based upon estimated improvements in hit rate for the workloads. Alternatively, memory manager 140 initially allocates a non-zero amount of memory to one or more workloads. In one embodiment, initial allocations are not equal. For example, memory manager 140 may initially allocate some memory to priority workloads while allocating no memory to others.

At block 1110, memory manager 140 determines an estimated improvement in hit rate for one or more workloads. In one embodiment, a value representing the estimated improvement is calculated by determining the difference between the miss rate of the MRC for the workload at the current allocation (e.g., current allocation 1005) and the miss rate of the MRC for the workload at an increased allocation (e.g., maximum/full allocation 1010). In one embodiment, the increased allocation used for comparison is the full allocation of memory for the workload. In an alternate embodiment, the increased allocation used for comparison is an incremental increase from the current allocation.

In one embodiment, memory manager 140 weights the estimated improvement values based upon priorities between workloads. For example, the estimated improvement value for a high priority VM 110 may be multiplied or otherwise increased by a corresponding weighting value. Alternatively, the estimated improvement value for a low priority VM 110 may be divided or otherwise decreased by a corresponding weighting value.

In one embodiment, the MRC is determined tracking hit counts for reuse distances using two data structures as described herein. Alternatively, the MRC is determined using a different algorithm, e.g., Mattson's stack algorithm or a variation thereof.

At block 1115, memory manager 140 determines if there is any additional memory to allocate. If there is additional memory for allocation, at block 1120, memory manager 140 selects one or more workloads with the greatest estimated improvement in hit rate. For example, given a plurality of VMs 110 running within host computer 135, memory manager 140 may select one or more VMs 110 that are estimated to have the largest decrease in miss rate for additional memory allocation. Alternatively, memory manager 140 may select one ore more workloads with an estimated improvement in hit rate that exceeds a threshold value.

At block 1125, memory manager 140 increases the amount of memory allocated to the one or more selected workloads. In one embodiment, memory allocation is incremented in a default amount. In an alternate embodiment, memory manager 140 determines the amount of additional memory to allocate based upon the estimated improvements. For example, memory manager 140 may determine estimated improvement values for a workload's miss rate at multiple amounts of increased allocation. Memory manager 140 may further determine the most efficient allocation increase, e.g., the greatest amount of improvement in hit rate per additional unit of memory allocated to the workload.

At block 1130, memory manager 140 determines if an event has occurred to trigger a reallocation of memory. For example, memory manager 140 may reallocate memory in response to a command from administrator device 106, a command from VIM server 130, a change in the total number of workloads/VMs 110, the expiration of a time period, etc. In one embodiment, memory manager 140 reallocates memory in response to determining that a difference in miss rate between the current allocation and an increased allocation is greater than a threshold improvement value. In such an embodiment, the determination whether or not to reallocate memory may occur prior to and/or instead of increasing the allocation for one or more selected workloads.

If memory manager 140 determines to reallocate memory, method 1100 returns to block 1105 to return each workload to a default allocation. If memory manager 140 determines not to reallocate memory, method 1100 returns to block 1110 to continue tuning memory allocation for one or more workloads.

If memory manager 140 determines that there is no additional memory available to allocate, at block 1135, memory manager 140 determines whether or not to reallocate memory. As described above, memory manager 140 may reallocate memory in response to a command from administrator device 106, a command from VIM server 130, a change in the total number of workloads/VMs 110, the expiration of a time period, etc. Additionally, memory manager 140 may reallocate memory if there is no additional memory available for allocation, if there is no additional memory available for allocation for longer than a threshold period of time, if there is no additional memory available for allocation and a difference in miss rate between the current memory allocation of a workload and an increased allocation is greater than a threshold improvement value, etc.

Figure 12:
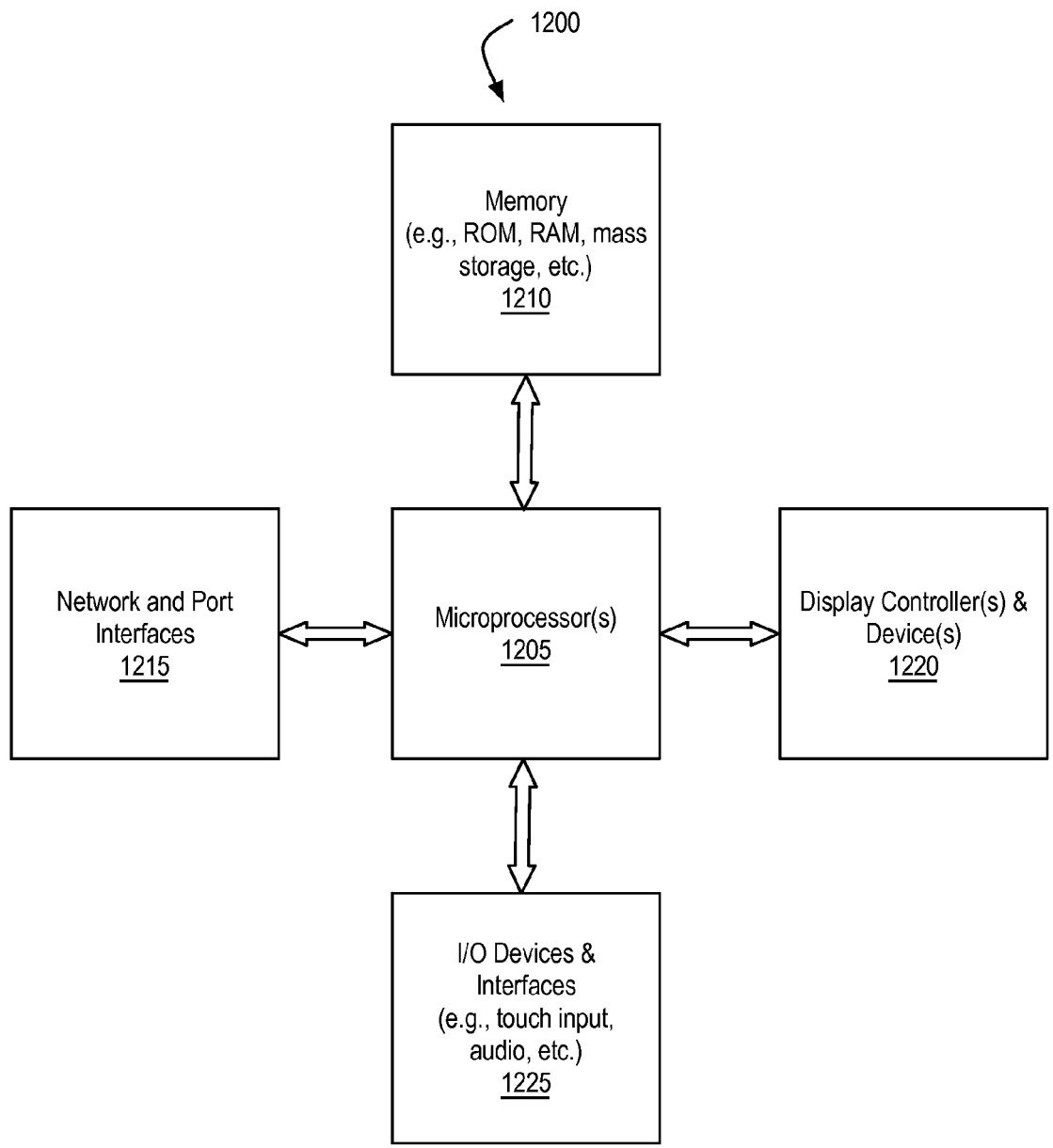
FIG. 12 illustrates, in block diagram form, an exemplary processing system to track data reuse and manage the allocation of memory to a plurality of workloads.

FIG. 12 illustrates, in block diagram form, an exemplary processing system 1200 to track data reuse and manage the allocation of memory to a plurality of workloads. Data processing system 1200 includes one or more microprocessors 1205 and connected system components (e.g., multiple connected chips). Alternatively, data processing system 1200 is a system on a chip.

Data processing system 1200 includes memory 1210, which is coupled to microprocessor(s) 1205. Memory 1210 may be used for storing data, metadata, and programs for execution by the microprocessor(s) 1205. Memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1210 may be internal or distributed memory.

Data processing system 1200 includes network and port interfaces 1215, such as a port, connector for a dock, or a connector for a USB interface, FireWire, Thunderbolt, Ethernet, Fibre Channel, etc. to connect the system 1200 with another device, external component, or a network. Exemplary network and port interfaces 1215 also include wireless transceivers, such as an I5 802.11 transceiver, an infrared transceiver, a Bluetooth transceiver, a wireless cellular telephony transceiver (e.g., 2G, 3G, 4G, etc.), or another wireless protocol to connect data processing system 1200 with another device, external component, or a network and receive stored instructions, data, tokens, etc.

Data processing system 1200 also includes display controller and display device 1220 and one or more input or output ("I/O") devices and interfaces 1225. Display controller and display device 1220 provides a visual user interface for the user. I/O devices 1225 allow a user to provide input to, receive output from, and otherwise transfer data to and from the system. I/O devices 1225 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 12.

Data processing system 1200 is an exemplary representation of one or more of client device(s) 105, administrator device 106, VIM server 140, host device(s) 135, VMMS 140, and storage device(s) 150 described above. Data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1200 may be a network computer, server, or an embedded processing device within another device or consumer electronic product. As used herein, the terms computer, device, system, processing system, processing device, and "apparatus comprising a processing device" may be used interchangeably with data processing system 1200 and include the above-listed exemplary embodiments.

It will be appreciated that additional components, not shown, may also be part of data processing system 1200, and, in certain embodiments, fewer components than that shown in FIG. 12 may also be used in data processing system 1200. It will be apparent from this description that aspects of the inventions may be embodied, at least in part, in software. That is, the computer-implemented methods 200 and 1100 may be carried out in a computer system or other data processing system 1200 in response to its processor or processing system 1205 executing sequences of instructions contained in a memory, such as memory 1210 or other non-transitory machine-readable storage medium. The software may further be transmitted or received over a network (not shown) via network interface device 1215. In various embodiments, hardwired circuitry may be used in combination with the software instructions to implement the present embodiments. Thus, the techniques are not limited to any specific combination of hardware circuitry and software, or to any particular source for the instructions executed by data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. As used herein, the term "exemplary" refers to embodiments that serve as simply an example or illustration. The use of exemplary should not be construed as an indication of preferred examples. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   receiving a first request for a storage address at a first access time;
   adding a first entry to a first data structure, wherein the first entry includes the storage address and the first access time, and wherein the first data structure is sorted in an order of storage addresses;
   adding a second entry to a second data structure, wherein the second entry includes the storage address and the first access time, and wherein the second data structure is sorted in an order of access times;
   receiving a second request for the storage address at a second access time;
   determining the first access time by looking up the first entry in first data structure using the storage address received in the second request;
   using the determined first access time to look up the second entry in the second data structure;
   determining a number of entries in second data structure that were subsequent to the second entry; and
   incrementing a hit count for a reuse distance corresponding to the determined number of entries.

2. The computer-implemented method of claim 1, wherein the first entry is added to the first data structure in response to determining that the first data structure does not include an entry for the storage address.

3. The computer-implemented method of claim 1, further comprising:
   modifying the first entry to replace the first access time with the second access time.

4. The computer-implemented method of claim 1, further comprising:
   adding a third entry to the second data structure, wherein the third entry includes the storage address and the second access time; and
   deleting the second entry to the second data structure.

5. The computer-implemented method of claim 1, further comprising:
   determining values within a miss-rate curve (MRC) using the hit count for the reuse distance.

6. The computer-implemented method of claim 5, wherein the MRC represents one of a plurality of current loads running within a computer, the method further comprising:
   updating a memory allocation for the workload based upon determined MRC.

7. The computer-implemented method of claim 6, wherein the workload is a virtual machine running within the computer.

8. The computer-implemented method of claim 1, further comprising:
   determining the storage address of the first and second requests is within the subset of storage addresses; and
   copying the hit count to a scaled reuse distance to account for utilizing only the subset of addresses in maintaining the first and second data structures.

9. A non-transitory computer-readable medium storing instructions, which when executed by a processing device, cause the processing device to perform a method comprising:
   receiving a first request for a storage address at a first access time;
   adding a first entry to a first data structure, wherein the first entry includes the storage address and the first access time, and wherein the first data structure is sorted in an order of storage addresses;
   adding a second entry to a second data structure, wherein the second entry includes the storage address and the first access time, and wherein the second data structure is sorted in an order of access times;
   receiving a second request for the storage address at a second access time;
   determining the first access time by looking up the first entry in first data structure using the storage address received in the second request;
   using the determined first access time to look up the second entry in the second data structure;
   determining a number of entries in second data structure that were subsequent to the second entry; and
   incrementing a hit count for a reuse distance corresponding to the determined number of entries.

10. The non-transitory computer-readable medium of claim 9, wherein the first entry is added to the first data structure in response to determining that the first data structure does not include an entry for the storage address.

11. The non-transitory computer-readable medium of claim 9, the method further comprising:

modifying the first entry to replace the first access time with the second access time.

12. The non-transitory computer-readable medium of claim 9, the method further comprising:
adding a third entry to the second data structure, wherein the third entry includes the storage address and the second access time; and
deleting the second entry to the second data structure.

13. The non-transitory computer-readable medium of claim 9, the method further comprising:
determining values within a miss-rate curve (MRC) using the hit count for the reuse distance.

14. The non-transitory computer-readable medium of claim 13, wherein the MRC represents one of a plurality of current loads running within a computer, the method further comprising:
updating a memory allocation for the workload based upon determined MRC.

15. The non-transitory computer-readable medium of claim 14, wherein the workload is a virtual machine running within the computer.

16. The non-transitory computer-readable medium of claim 9, the method further comprising:
determining the storage address of the first and second requests is within the subset of storage addresses; and
copying the hit count to a scaled reuse distance to account for utilizing only the subset of addresses in maintaining the first and second data structures.

17. An apparatus comprising:
a processing device; and
a memory coupled to the processing device, the memory storing instructions which, when executed by the processing device, cause the apparatus to:
receive a first request for a storage address at a first access time;
add a first entry to a first data structure, wherein the first entry includes the storage address and the first access time, and wherein the first data structure is sorted in an order of storage addresses;
add a second entry to a second data structure, wherein the second entry includes the storage address and the first access time, and wherein the second data structure is sorted in an order of access times;
receive a second request for the storage address at a second access time;
determine the first access time by looking up the first entry in first data structure using the storage address received in the second request;
use the determined first access time to look up the second entry in the second data structure;
determine a number of entries in second data structure that were subsequent to the second entry; and
increment a hit count for a reuse distance corresponding to the determined number of entries.

18. The apparatus of claim 17, wherein the first entry is added to the first data structure in response to determining that the first data structure does not include an entry for the storage address.

19. The apparatus of claim 17, wherein the execution of the instructions further cause the apparatus to:
determine values within a miss-rate curve (MRC) using the hit count for the reuse distance, wherein the MRC represents one of a plurality of current loads running within a computer; and
update a memory allocation for the workload based upon determined MRC.

20. The apparatus of claim 17, wherein the execution of the instructions further cause the apparatus to:
determine the storage address of the first and second requests is within the subset of storage addresses; and
copy the hit count to a scaled reuse distance to account for utilizing only the subset of addresses in maintaining the first and second data structures.

\* \* \* \* \*